United States Patent
Okamoto et al.

(10) Patent No.: US 6,770,106 B1
(45) Date of Patent: Aug. 3, 2004

(54) PARTIAL OXIDATION REFORMER

(75) Inventors: Yasunori Okamoto, Osaka (JP); Nobuki Matsui, Osaka (JP); Shuji Ikegami, Osaka (JP); Kazuo Yonemoto, Osaka (JP); Eisaku Okubo, Osaka (JP); Isao Ohgami, Osaka (JP)

(73) Assignee: Daikin Industries, LTD (JP)

( * ) Notice: Subject to any disclaimer, the term of this patent is extended or adjusted under 35 U.S.C. 154(b) by 512 days.

(21) Appl. No.: 09/914,377

(22) PCT Filed: Nov. 8, 2000

(86) PCT No.: PCT/JP00/07868

§ 371 (c)(1),
(2), (4) Date: Aug. 28, 2001

(87) PCT Pub. No.: WO01/47800

PCT Pub. Date: Jul. 5, 2001

(30) Foreign Application Priority Data

Dec. 28, 1999 (JP) .......................... 11-373618

(51) Int. Cl.$^7$ .............................. C01B 3/38; H01M 8/06
(52) U.S. Cl. ..................................................... 48/127.9
(58) Field of Search ........................... 48/61, 62 R, 89, 48/119, 127.9, 198.1, 198.3, 198.7, 211, 212, 214 R, 215, 214 A; 422/188–191, 193, 198, 200, 202–205, 211, 222

(56) References Cited

U.S. PATENT DOCUMENTS

| 5,030,440 A | 7/1991 | Lywood et al. |
| 5,324,452 A | * 6/1994 | Allam et al. ................. 252/373 |

FOREIGN PATENT DOCUMENTS

| DE | 003912003 A1 | * 10/1989 |
| EP | 600621 | 6/1994 |
| EP | 001167282 A1 | * 2/2002 |
| JP | 52-11058 | 1/1977 |
| JP | 59-73403 | 4/1984 |
| JP | 60-181588 | 9/1985 |
| JP | 10-106606 | 4/1998 |

* cited by examiner

Primary Examiner—Samuel M. Heinrich
(74) Attorney, Agent, or Firm—Nixon Peabody LLP; Donald R. Studebaker

(57) ABSTRACT

Hydrogen-rich reformed gas is produced by reaction including partial oxidation of feed gas in a reforming reaction section (6). In this case, for the purpose of reducing temperature variations in the reforming reaction section (6), improving the thermal efficiency thereof and providing a reformer (A) with a simple and compact construction, the reformer (A) is formed in a double-wall structure consisting of a housing (1) and partitions (2), (2) inside of the housing (1), the reforming reaction section (6) is contained between the partitions (2), (2), and a feed gas passage (3) is provided by the space between the housing (1) and the partition (2). In this manner, the feed gas passage (3) is provided in the surrounding area of the reforming reaction section (6). The reforming reaction section (6) is thermally insulated by the feed gas passage (3) so that temperature variations in the reforming reaction section (6) can be reduced. The feed gas in the feed gas passage (3) is preheated by heat of reaction in the reforming reaction section (6) so that the self-recovery of heat can improve thermal efficiency of the reformer (A). In addition, a preheater for preheating the feed gas can be formed integrally between the feed gas passage (3) and the reforming reaction section (6) thereby compacting the construction of the reformer.

12 Claims, 14 Drawing Sheets

PARTIAL OXIDATION REFORMER

TECHNICAL FIELD

This invention relates to a partial oxidation reformer for reforming hydrocarbon-based feed gas by partial oxidation reaction to produce hydrogen for the supply to fuel cells or the like.

BACKGROUND ART

In general, hydrogen can be produced by reforming hydrocarbon or methanol. Fuel reforming units for producing hydrogen through such reforming can be used for fuel cells, hydrogen engines or the like.

As a reforming unit of such kind, there is conventionally known one which is incorporated into a fuel cell system as disclosed in Japanese Unexamined Patent Publication No. 11-67256. This fuel reforming unit includes a fuel reformer loaded with catalyst which exhibits activity to partial oxidation reaction, and is designed to introduce feed gas into the fuel reformer to produce hydrogen by partial oxidation reaction of the feed gas.

Specifically, in the partial oxidation reaction, feed gas containing methane, oxygen and water is partially oxidized to convert into carbon dioxide and hydrogen as expressed in the following chemical formula and heat of reaction is produced during the reaction.

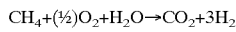

$$CH_4 + (\tfrac{1}{2})O_2 + H_2O \rightarrow CO_2 + 3H_2$$

Meanwhile, as another reforming unit of such kind, there is known one including a reforming reaction section with a structure in which a pipe (housing) is loaded with particulate catalysts or a monolith. In this unit, there arises the problem that heat of reaction in the reforming reaction section, which may be elevated to for example about 800° C., is likely to flow outside as heat loss so that temperature variations occur in the reforming reaction section to deteriorate the efficiency of reaction and thermal efficiency. In order to avoid heat of reaction from dissipating outside, it is necessary to provide a thick thermal insulant around the pipe.

Further, in order to promote partial oxidation reaction of feed gas in the reforming reaction section, it is necessary to preheat the feed gas being fed to the reforming reaction section to a predetermined temperature (for example, 460° C.) and in order to implement such preheating, it is also necessary to provide a preheater formed of a heat exchanger.

An object of the present invention is therefore to reduce temperature variations in the reforming reaction section, improve the thermal efficiency thereof and provide the reformer with a simple and compact construction, by contriving the construction of the reformer.

DISCLOSURE OF INVENTION

To attain the above object, in the present invention, the reformer is of a double-wall structure type and a reforming reaction section and a feed gas passage are disposed inside and outside of the inner wall, respectively.

More specifically, the present invention is directed to a partial oxidation reformer having a reforming reaction section (6) for producing hydrogen-rich reformed gas from feed gas by reaction including partial oxidation. In this reformer, a feed gas passage (3) through which the feed gas is supplied to the reforming reaction section (6) is provided in the vicinity of the reforming reaction section (6).

Thus, the sides of the reforming reaction section (6) are covered with the feed gas passage (3) and therefore thermally insulated by the feed gas passage (3). As a result, temperature variations in the reforming reaction section (6) can be reduced.

Further, conversely, the feed gas in the feed gas passage (3) in the vicinity of the reforming reaction section (6) is heated by heat of reaction in the reforming reaction section (6). Accordingly, the heat of reaction in the reforming reaction section (6) can be recovered for the purpose of preheating the feed gas. Such self-recovery of heat can improve the thermal efficiency of the reformer.

In addition, since the heat of reaction in the reforming reaction section (6) heats the feed gas in the feed gas passage (3) around the reforming reaction section (6) in the above manner, a preheater for preheating the feed gas can be formed integrally between the feed gas passage (3) and the reforming reaction section (6). This makes the construction of the reformer simple and compact.

Alternatively, in a partial oxidation reformer of the present invention which has a reforming reaction section (6) for producing hydrogen-rich reformed gas from feed gas by reaction including partial oxidation, a heat exchanger (14) is provided for exchanging heat between the reformed gas in a reformed gas passage (11) communicating with an outlet (6b) of the reforming reaction section (6) and the feed gas in a feed gas passage (3) communicating with an inlet (6a) of the reforming reaction section (6).

Thus, the feed gas in the feed gas passage (3) which should be supplied to the reforming reaction section (6) is heated in the heat exchanger (14) through the heat exchange with the reformed gas heated to a high temperature by heat of reaction in the reforming reaction section (6). Accordingly, the heat of reaction in the reforming reaction section (6) can be recovered for the purpose of preheating the feed gas and such self-recovery of heat can improve the thermal efficiency of the reformer.

In addition, since the heat of reaction in the reforming reaction section (6) heats the feed gas in the feed gas passage (3) in the above manner, a preheater for preheating the feed gas is formed integrally between the feed gas passage (3) and the reformed gas passage (11). This makes the construction of the reformer simple and compact.

The reforming reaction section (6) and the feed gas passage (3) may be provided integrally in a housing (1). This further simplifies the construction of the reformer, resulting in cost reduction.

A heat transfer rate control member (10) can be provided for controlling the rate of heat transfer between the reforming reaction section (6) and the feed gas passage (3). Thus, the rate of heat exchange between the reforming reaction section (6) and the fuel gas in the feed gas passage (3) can be properly controlled by the heat transfer rate control member (10), and the control over the rate of heat exchange can reduce temperature variations in the reforming reaction section (6).

In this case, the heat transfer rate control member (10) may be of fire-resistant thermal insulant. This easily provides a specific structure of the heat transfer rate control member (10).

The feed gas passage (3) may be provided in the vicinity of a reformed gas passage (11) communicating with an outlet (6b) of the reforming reaction section (6), and a heat exchanger (14) may be provided for exchanging heat between the feed gas in the feed gas passage (3) and the reformed gas in the reformed gas passage (11). Also in this case, the heat exchanger (14) is integrally formed as a preheater for preheating the feed gas between the feed gas passage (3) and the reformed gas passage (11), thereby making the construction of the reformer simple and compact.

The heat exchanger (14) preferably includes heat transfer fins (15), (16) that are presented to the feed gas passage (3) and the reformed gas passage (11), respectively, and extend along respective gas flows in the feed and reformed gas passages. Thus, gas pressure loss in the heat exchanger (14) can be reduced and the heat exchanger (14) can be compacted.

Further, the heat exchanger (14) may include porous materials (24), (25) (such as metallic foamed materials or ceramics foams) located in the feed gas passage (3) and the reformed gas passage (11), respectively. With this structure, heat exchange can be made by heat radiation through the porous materials (24), (25). This easily provides a specific structure of the heat exchanger (14).

Furthermore, the reforming reaction section (6), the feed gas passage (3), the reformed gas passage (11) and the heat transfer rate control member (10) may be provided integrally in a housing (1). Thus, the construction of the reformer can be further simplified, resulting in cost reduction.

The reforming reaction section (6) may be formed of a monolith (7) with a honeycomb structure. This provides the reforming reaction section (6) with a desirable structure.

The feed gas passage (3) may include a mixer for mixing components of the feed gas. In this case, the components of the feed gas are mixed by the mixer so that partial oxidation reaction can be efficiently effected in the reforming reaction section (6).

The heat exchanger (14) is preferably a parallel flow heat exchanger in which the feed gas in the feed gas passage (3) and the reformed gas in the reformed gas passage (11) flow in the same direction from inlet to outlet.

With this arrangement, even if the gas flow rate changes in the reforming reaction section (6) due to a load variation, the gas temperatures at the inlet and outlet of the reforming reaction section (6) can be each held substantially at a constant value without being affected by the change in gas flow rate. That is to say, since the amount of heat exchange in the heat exchanger (14) is constant, for a heat exchanger of the type which causes the feed gas and the reformed gas to flow in opposite directions from inlet to outlet, the heat exchange rate becomes excessive on reduction in gas flow rate so that the feed gas temperature at the inlet may rise excessively while the reformed gas temperature at the outlet may drop excessively. In contrast, for the parallel flow heat exchanger (14), there never arise such a problem.

The heat transfer fins (15), (16) may be bent in a corrugated shape. In this case, the heat transfer fins (15), (16), that is, the heat exchanger (14), can be easily manufactured.

The heat transfer fins (15), (16) may be fixed to surrounding walls by brazing. With this arrangement, the contact thermal resistance of the heat transfer fins (15), (16) to the surrounding walls is reduced thereby ensuring stable heat exchange performance with volume production.

The heat transfer fins (15), (16) may be each formed with slits (17). In this case, even if the gas passages (3), (11) are each divided into two sub-passages located at a heat transfer surface side thereof and its opposite side by the heat transfer fins (15), (16) in the heat exchanger (14), gases in both the sub-passages are mixed through the slits (17). This enables sufficient heat exchange of the gas in the opposite side sub-passage and provides high heat transfer performance at corners of the slit (17). Accordingly, heat exchange characteristics of the heat exchanger (14) can be improved.

The feed gas passage (3) may be provided at a portion thereof upstream from the heat exchanger (14) with a heat recovery section (34) formed of a substantially annular space which is located away from the reforming reaction section (6) or the heat exchanger (14) to surround at least one of the reforming reaction section (6) and the heat exchanger (14).

With this arrangement, heat dissipating from the reforming reaction section (6) to the surroundings can be recovered by the heat recovery section (34) to heat the feed gas. As a result, the heat loss of the entire partial oxidation reformer can be reduced so that the feed gas temperature at the inlet (6a) of the reforming reaction section (6) can be held at a temperature at which excellent catalytic reaction can be maintained in the reforming reaction section (6).

A heat transfer rate control member (22) may be interposed between the heat recovery section (34) and the reforming reaction section (6) or the heat exchanger (14). With this arrangement, the distance between the heat recovery section (34) and the reforming reaction section (6) or the heat exchanger (14) can be decreased thereby enabling compaction of the partial oxidation reformer with the provision of the heat recovery section (34).

Further, the heat recovery section (34) and the heat exchanger (14) may be communicated with each other through a single or plurality of communication passages (32). This simplifies the construction of the partial oxidation reformer and facilitates insertion of the heat transfer rate control member (22) to be interposed between the heat recovery section (34) and the reforming reaction section (6) or the heat exchanger (14), thereby facilitating fabrication of the partial oxidation reformer.

The reformed gas passage (11) may be provided in the vicinity of the reforming reaction section (6) to communicate the outlet (6b) of the reforming reaction section (6) with the heat exchanger (14) therethrough.

With this arrangement, the periphery of the reforming reaction section (6) is covered with the reformed gas passage (11) so as to be thermally insulated. Accordingly, the temperature in the reforming reaction section (6) can be held at catalytic reaction temperatures.

In addition, since the reformed gas passage (11) leading from the outlet (6b) of the reforming reaction section (6) to the heat exchanger (14) is integrally formed around the reformed reaction section (6) in the above manner, this makes the construction of the reformer simple and compact.

Further, the reforming reaction section (6) may be divided into a first reaction section (43) and a second reaction section (44), the second reaction section (44) being provided in the vicinity of the first reaction section (43) to communicate at an inlet thereof with an outlet of the first reaction section (43), and the first and second reaction sections (43), (44) may have gas flows in opposite directions.

Also in this case, the periphery of the first reaction section (43) of the reforming reaction section (6) is covered with the second reaction section (44) so as to be thermally insulated. Accordingly, the temperature in the reforming reaction section (6) can be maintained. In addition, since the reforming reaction section (6) itself has a double-wall structure, the reformer can have a simple and compact construction.

In each of the above arrangements, a heating means (20) may be provided for heating the feed gas at start-up. With this arrangement, the feed gas can be preheated exclusively at the start-up of the reformer, thereby reducing the start-up time of the reformer.

BEST MODE FOR CARRYING OUT THE INVENTION

The best mode for carrying out the invention will be described below as embodiments.

Embodiment 1

Figure 1:
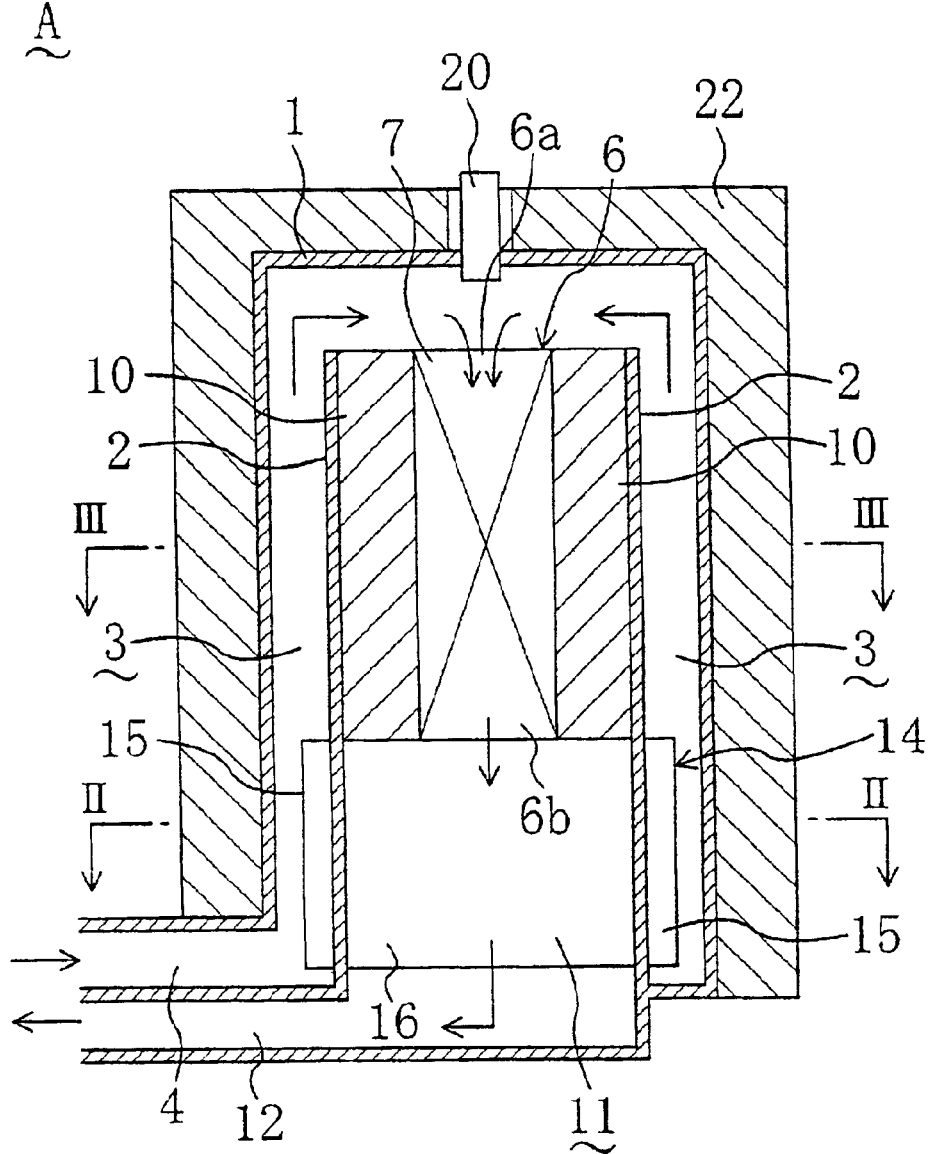
FIG. 1 is a cross-sectional view illustrating a partial oxidation reformer according to Embodiment 1 of the present invention.

FIG. 1 illustrates a partial oxidation reformer (A) according to Embodiment 1 of the present invention, wherein (1) denotes a housing (1) in the shape of a bottomed rectangular tube. Inside the housing (1), a pair of opposed partitions (2), (2) are disposed to divide the internal space thereof into one inner subspace and two outer subspaces, and both the partitions (2), (2) are formed integrally with the housing (1) (see FIGS. 2 and 3). In each of the partitions (2), one end thereof located on its housing (1) bottom side (upper side in FIG. 1) is cut away so that the inner and outer subspaces communicates with each other, and the communicating part between the inner and outer subspaces and both the outer subspaces themselves constitute a feed gas passage (3). In the feed gas passage (3), one end of each of the outer subspaces located on its housing (1) opening side (lower side in FIG. 1) provides a feed gas inlet (4). This feed gas inlet (4) is connected to a feed gas pipe located externally to the figure and arranged to supply the feed gas (containing city gas and moist air) fed past the feed gas pipe to the feed gas passage (3) between the housing (1) and each of the partitions (2) therethrough.

At a housing (1) bottom side of the inner subspace between the partitions (2), (2), a reforming reaction section (6) is provided for reforming the feed gas to produce hydrogen-rich reformed gas from the feed gas by reaction including partial oxidation. An inlet (6a) of the reforming reaction section (6) located on its housing (1) bottom side is communicated with the feed gas passage (3) at a position corresponding to the housing (1) bottom. In other words, the feed gas passage (3) for supplying the feed gas to the reforming reaction section (6) is disposed partially around the reforming reaction section (6), and the reforming reaction section (6) and the feed gas passage (3) are provided integrally in the housing (1).

Figure 3:
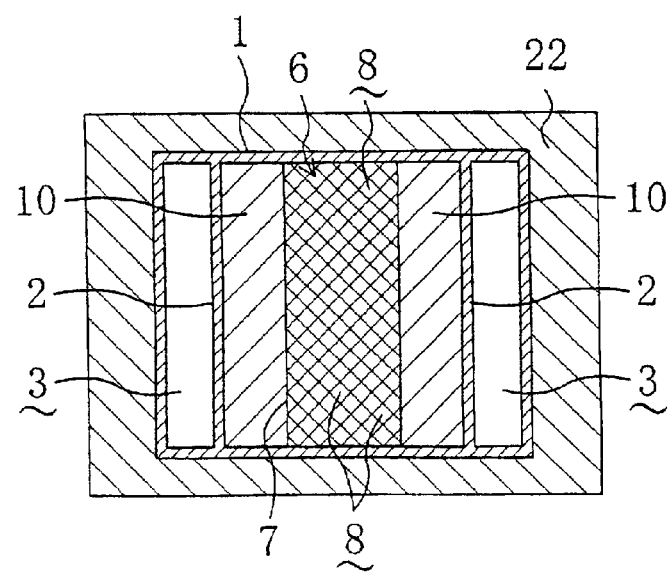
FIG. 3 is a cross-sectional view taken along the line III—III of FIG. 1.

The reforming reaction section (6) is formed of a monolith (7) with a honeycomb structure which is fitted between the partitions (2), (2) as shown in FIG. 3. In this monolith (7), a large number of through holes passing through the monolith in an axial direction of the housing (1) (the vertical direction in FIG. 1) provide a gas passage (8). The monolith (7) is made for example from ceramics or aluminium, and noble metal catalyst comprising at least either Pt, Rh or Ru is supported on the monolith (7) as a support. The feed gas is reformed into hydrogen-rich reformed gas by undergoing partial oxidation reaction, as is expressed in the following chemical formula, with the catalyst while passing through the gas passage (8) of the monolith (7).

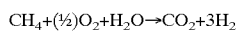

$$CH_4 + (½)O_2 + H_2O \rightarrow CO_2 + 3H_2$$

Further, in the inner subspace between the partitions (2), (2), a pair of heat transfer rate control members (10), (10) of fire-resistant thermal insulant are disposed so as to be fitted in gas-tight manner on both sides of the reforming reaction section (6). Each of these heat transfer rate control members (10) controls the rate of heat transfer between the reforming reaction section (6) and the feed gas passage (3).

Meanwhile, a portion of the inner subspace between the partitions (2), (2) located on its housing (1) opening side (lower side in FIG. 1) is formed into a reformed gas passage (11) which communicates with the outlet (6b) of the reforming reaction section (6), and allows the reformed gas produced from the feed gas in the reforming reaction section (6) to flow through the reformed gas passage (11). Accordingly, the feed gas passage (3) is disposed in the vicinity of the reformed gas passage (11) which communicates with the outlet (6b) of the reforming reaction section (6). Further, the reforming reaction section (6), the feed gas passage (3), the reformed gas passage (11) and the heat transfer rate control members (10), (10) are formed integrally in the housing (1). One end of the reformed gas passage (11) located on its housing (1) opening side provides a reformed gas outlet (12), and the reformed gas outlet (12) is connected to a fuel cell or the like through a reformed gas pipe located externally to the figure.

Figure 2:
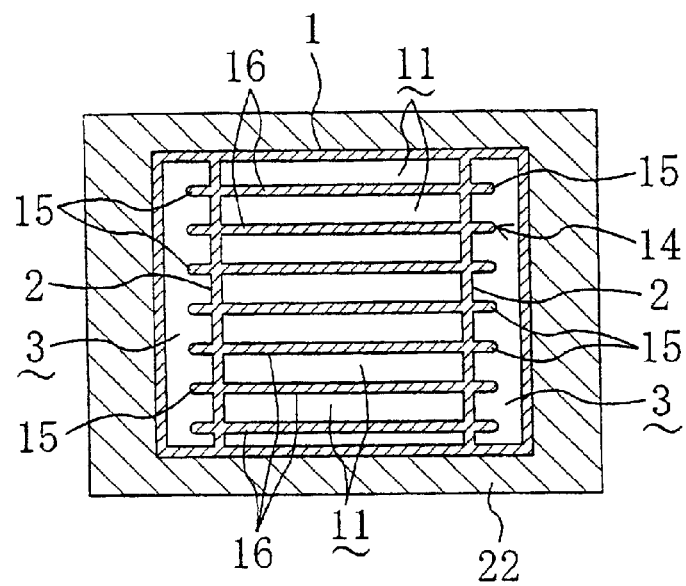
FIG. 2 is a cross-sectional view taken along the line II—II of FIG. 1.

Furthermore, as shown in FIG. 2, a heat exchanger (14) is provided for exchanging heat between the feed gas in the feed gas passage (3) and the reformed gas in the reformed gas passage (11). The heat exchanger (14) has a plurality of feed gas side heat transfer fins (15), (15), . . . extending in parallel with each other from each of the partitions (2) so as to be presented to the feed gas passage (3) and a plurality of reformed gas side heat transfer fins (16), (16), . . . extending in parallel with each other so as to be presented to the reformed gas passage (11). The feed gas passage (3) also includes a mixer consisting of the plurality of feed gas side heat transfer fins (15), (15), . . . , and the mixer mixes components of the feed gas supplied to the reforming reaction section (6), that is, city gas and moist air, by stirring.

Moreover, an electric heater (20) as a heating means is attached to the bottom of the housing (1) with its heating section presented to the feed gas passage (3) inside of the housing (1). This heater (20) is operated to heat (preheat) the feed gas to a predetermined temperature at the start-up of the reformer (A). It is to be noted that instead of the electric heater (20), a glow plug may be provided or means such as a burner for igniting the feed gas itself into combustion can be provided. Further, in FIGS. 1 to 3, (22) denotes a thermal insulator for covering the outer periphery of the housing (1) for thermal insulation.

According to this embodiment, during steady-state operation of the reformer (A), the feed gas (containing city gas and moist air) fed through the feed gas pipe is introduced into the housing (1) through the feed gas inlet (4) and then supplied to the feed gas passage (3) between the housing (1) and each of the partitions (2). Since the feed gas side heat transfer fins (15), (15), . . . of the heat exchanger (14) are presented to the feed gas passage (3) and the reformed gas side heat transfer fins (16), (16), . . . of the heat exchanger (14) are presented to the reformed gas passage (11) between the partitions (2), (2), the heat exchanger (14) heat-exchanges the feed gas and the reformed gas so that the feed gas is preheated to a predetermined temperature (for example, 460° C.) by receiving heat from the reformed gas. In addition, during the time, the mixer consisting of the feed gas side heat transfer fins (15), (15), . . . of the heat exchanger (14) mixes the city gas and moist air contained in the feed gas by stirring.

The feed gas preheated through the heat exchange with the reformed gas in this manner flows through the feed gas passage (3) toward the housing (1) bottom, during the time heat of reaction in the reforming reaction section (6) is transferred to the feed gas via the heat transfer rate control member (10) (thermal insulant) and the partition (2), and the heat transfer further heats up the feed gas.

The feed gas having passed through the feed gas passage (3) flows into the reforming reaction section (6) through the inlet (6a) located on the housing (1) bottom side thereof, reacts with the catalyst in the gas passage (8) in the monolith (7) of honeycomb structure and is thereby reformed into hydrogen-rich reformed gas.

During the time, the mixer mixes the city gas and moist air in the feed gas so that partial oxidation reaction in the reforming reaction section (6) can be efficiently made.

Further, the heat of reaction in the reforming reaction section (6) is transferred via the heat transfer rate control member (10) and the partition (2) to the feed gas consecutively flowing through the feed gas passage (3). In addition, the heat transfer rate control member (10) controls the rate of heat transfer between the reforming reaction section (6) and the surrounding feed gas passage (3), which enables proper control over the rate of heat exchange for causing the heat of reaction in the reforming reaction section (6) to heat the fuel gas in the feed gas passage (3). Conversely, the control over the heat transfer rate enables reduction in temperature variation in the reforming reaction section (6) and thereby provides further efficient progress of partial oxidation reaction in the reforming reaction section (6).

The high-temperature reformed gas produced from the feed gas in the reforming reaction section (6) flows through the outlet (6b) of the reforming reaction section (6) into the reformed gas passage (11) located between the partitions (2), (2) and on the housing (1) opening side thereof, is discharged from the reformed gas passage (11) to the reformed gas pipe through the reformed gas outlet (12), and is then supplied to the fuel cell or the like. Since the reformed gas side heat transfer fins (16), (16), . . . of the heat exchanger (14) are presented to the reformed gas passage (11), the heat of the reformed gas is recovered by the heat exchanger (14) and transferred to the feed gas, which consecutively flows through the feed gas passage (3), via the feed gas side heat transfer fins (15), (15), . . .

In this embodiment, since the feed gas passage (3) is provided in the vicinity of the reforming reaction section (6) as described above, the sides of the reforming reaction section (6) are covered with the feed gas passage (3) so as to be thermally insulated by the feed gas passage (3), which further reduces temperature variations in the reforming reaction section (6).

Further, conversely, since the feed gas in the feed gas passage (3) in the vicinity of the reforming reaction section (6) is heated by the heat of reaction in the reforming reaction section (6), the heat of reaction in the reforming reaction section (6) can be recovered for the purpose of preheating the feed gas and this self-recovery of heat can improve the thermal efficiency of the reformer (A).

In addition, since the feed gas in the feed gas passage (3) in the vicinity of the reforming reaction section (6) is heated by the heat of reaction in the reforming reaction section (6) in the above manner, a preheater for preheating the feed gas is formed integrally between the feed gas passage (3) and the reforming reaction section (6), which simplifies and compacts the construction of the reformer (A).

Moreover, since the reforming reaction section (6) and the feed gas passage (3) are formed integrally in the housing (1), this further simplifies the construction of the reformer (A), resulting in const reduction.

Further, since the feed gas passage (3) is provided in the vicinity of the reformed gas passage (11) communicating with the outlet (6b) of the reforming reaction section (6) and the feed gas in the feed gas passage (3) is heat-exchanged with the reformed gas in the reformed gas passage (11) by the heat exchanger (14), the heat exchanger (14) is formed integrally between the feed gas passage (3) and the reformed gas passage (11), which provides the reformer (A) with a simple and compact construction.

Furthermore, since the reforming reaction section (6), the feed gas passage (3), the reformed gas passage (11) and the heat transfer rate control members (10), (10) are provided integrally in the housing (1), the construction of the reformer (A) can be further simplified, resulting in cost reduction.

Further, upon start-up of the reformer (A), the electric heater (20) is operated to heat the feed gas in the feed gas passage (3) up to an active temperature of the catalyst in the reforming reaction section (6). This reduces the start-up time of the reformer (A) until it comes into steady-state operation.

Embodiment 2

Figure 4:
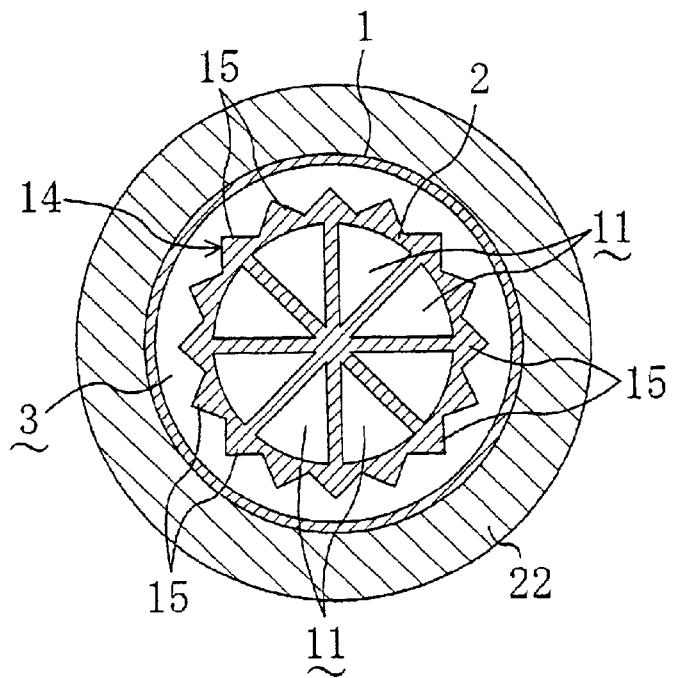
FIG. 4 is a corresponding view of FIG. 2 which shows Embodiment 2.

FIG. 4 shows Embodiment 2 of the present invention (note that in each of embodiments hereinafter described like parts as in FIGS. 1 to 3 are designated by like reference characters and the description thereof is omitted), wherein the construction of Embodiment 1 is changed in the shapes of a housing (1) and partitions (2), (2).

Specifically, in this embodiment, the housing (1) and the partition (2) are each formed in a cylindrical shape so as to be disposed concentrically, an annular outside subspace around the partition (2) is formed into a feed gas passage (3), and an inner subspace is provided with a reforming reaction section (6), a heat transfer rate control member (10) and a reformed gas passage (11). It is to be noted that a monolith (7) of the reforming reaction section (6) is cylindrical and the heat transfer rate control member (10) is annular, although they are not shown.

Further, feed gas side heat transfer fins (15), (15), . . . of the heat exchanger (14) are extended from the outer periphery of the partition (2), while reformed gas side heat transfer fins (16), (16), ... are extended from the inner surface of the partition (2) to divide the reformed gas passage (11) into plural sections.

Accordingly, also in this embodiment, the same effects as those of Embodiment 1 can be exhibited. In particular, since the feed gas passage (3) is located all around both the reforming reaction section (6) and the reformed gas passage (11), this provides the effects of reduction in temperature variations and improvement in thermal efficiency more effectively.

Embodiment 3

Figure 5:
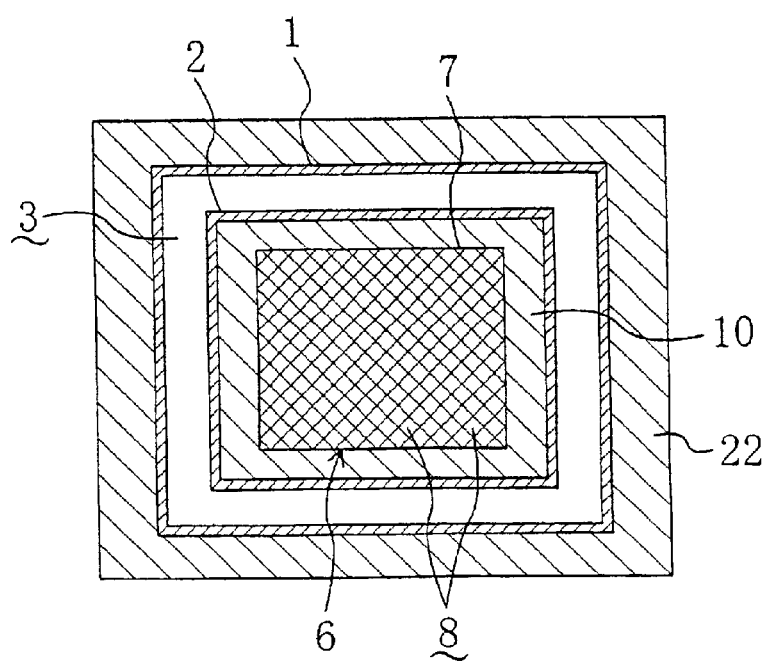
FIG. 5 is a corresponding view of FIG. 3 which shows Embodiment 3.

FIG. 5 shows Embodiment 3, wherein the structure of the surroundings of a reforming reaction section (6) is changed. Specifically, in this embodiment, a housing (1) and a partition (2) are each formed in the shape of a rectangular tube, like Embodiment 1 (see FIG. 1). Further, an outer subspace located all around a portion of the partition (2) corresponding to a reforming reaction section (6) provides a feed gas passage (3). An inner subspace is provided with the reforming reaction section (6) having a prismatic monolith (7) and a heat transfer rate control member (10) in rectangular tube shape which is located around the reforming reaction section (6). Other structures are the same as those of Embodiment 1. Accordingly, also in this embodiment, the same effects as those of Embodiment 1 can be exhibited.

Embodiment 4

Figure 6:
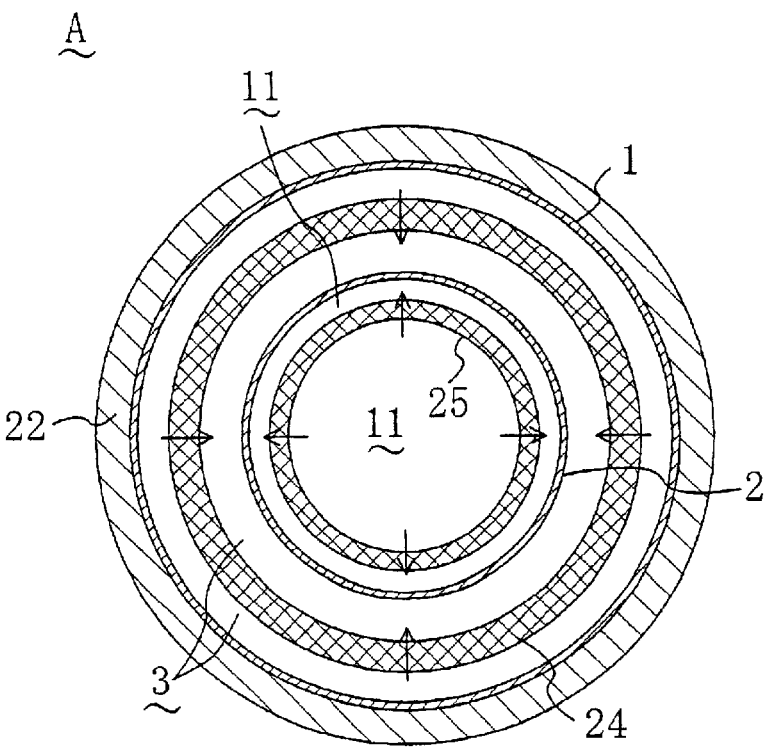
FIG. 6 is a corresponding view of FIG. 2 which shows Embodiment 4.
Figure 7:
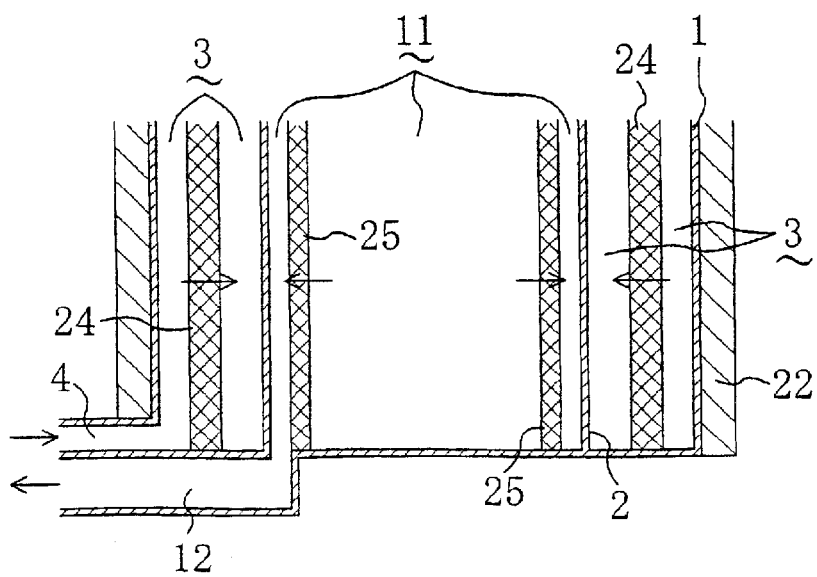
FIG. 7 is a cross-sectional view showing essential part of Embodiment 4.

FIGS. 6 and 7 show Embodiment 4. In embodiment 2, the heat exchanger (14) includes the heat transfer fins (15), (16). In contrast, the reformer of this embodiment includes porous materials located in a feed gas passage (3) and a reformed gas passage (11), respectively.

Specifically, in this embodiment, the feed gas side heat transfer fins (15), (15), ... and the reformed gas side heat transfer fins (16), (16), ... in the construction of Embodiment 2 (see FIG. 4) are omitted. Instead of this, in the feed gas passage (3), a cylindrical feed gas side porous material (24) formed for example of metallic foamed material or ceramics foam is disposed between the inner periphery of the housing (1) and the outer periphery of the partition (2) with spaces (both of which constitute the feed gas passage (3)) interposed therebetween, so that the feed gas flows from a portion of the feed gas passage (3) outside of the feed gas side porous material (24) through the porous material (24) to a portion of the feed gas passage (3) inside of the porous material (24).

On the other hand, in the reformed gas passage (11), a similar reformed gas side porous material (25) is provided with a space (reformed gas passage (11)) left inside of the inner periphery of the partition (2), so that the reformed gas flows from a portion of the reformed gas passage (11) inside of the reformed gas side porous material (25) through the porous material (25) to a portion of the reformed gas passage (11) outside of the porous material (25). Further, heat exchange is made between the feed gas in the feed gas passage (3) and the reformed gas in the reformed gas passage (11) by heat radiation from the porous materials (24), (25). Other structures are the same as those of Embodiment 2. Accordingly, also in this embodiment, the same effects as those of Embodiment 2 can be obtained.

Embodiment 5

Figure 8:
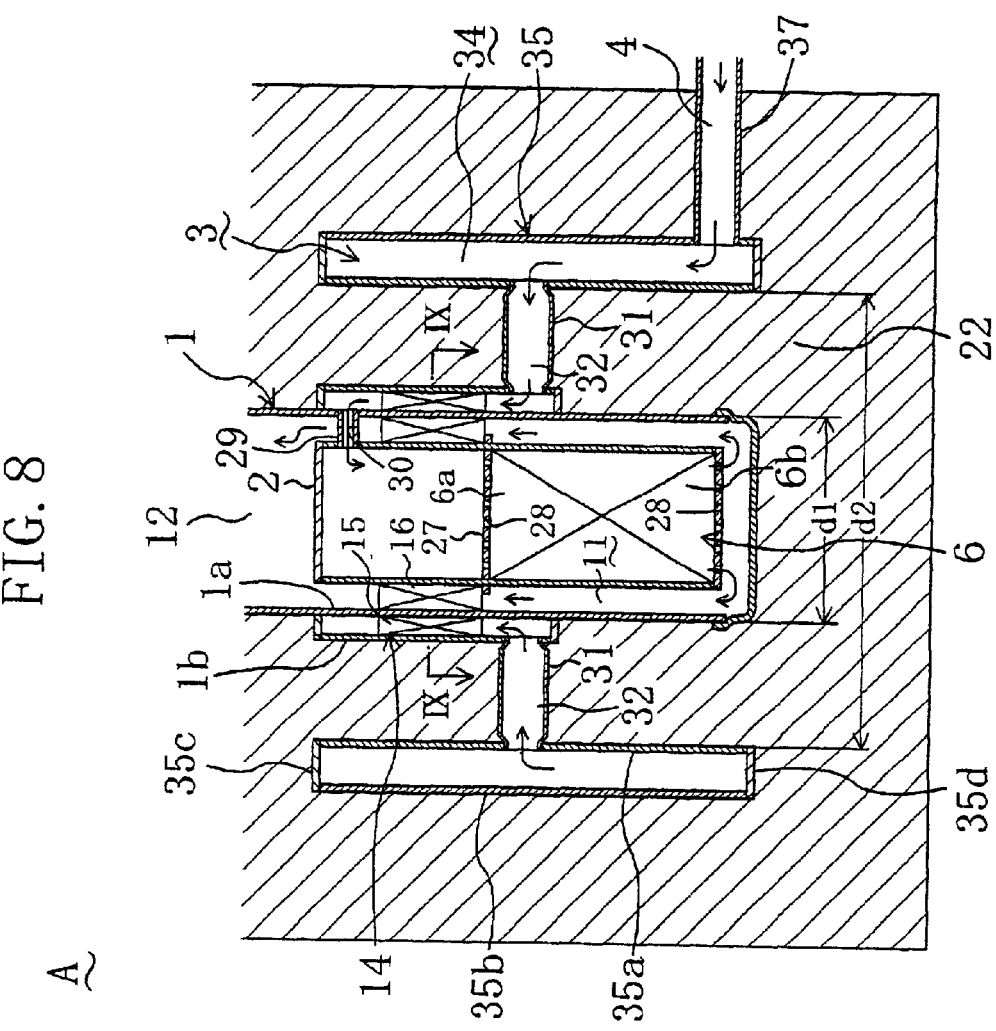
FIG. 8 is a cross-sectional view of a reformer showing Embodiment 5.

FIG. 8 shows Embodiment 5 (note that in each embodiment of Embodiment 5 and later, i.e., in Embodiments 5 to 11, the terms "upper" and "top" and the terms "lower" and "bottom" respectively refer to the upper side and lower side in each of the drawings and do not define the vertical direction of the partial oxidation reformer (A) itself). In Embodiment 5, a housing (1) is substantially in the shape of a closed cylinder, and the upper end of the housing (1) is formed into a reformed gas outlet (12). In a lower portion of the inner space of the housing (1), a partition (2) substantially in closed cylinder shape is fixedly disposed in concentric relation with the housing (1) such that a clearance is left between both the bottom walls of the partition (2) and the housing (1). The inner space of the partition (2) is divided into upper and lower subspaces by an inlet side divider (27), and a reforming reaction section (6) is contained in the lower subspace. Further, the bottom wall the partition (2) and the inlet side divider (27) each have a large number of gas holes (28), (28), ... formed therethrough.

The upper portion of the housing (1) is provided in a double-wall structure consisting of an inner wall part (1a) located in the same level as the lower portion of the housing (1) and an outer wall part (1b) connected to the inner wall part (1a) in gas-tight manner so as to be spaced a distance away from the outer periphery of the inner wall part (1a). As a result, an annular space is created between both the wall parts (1a) (1b). The space between both the wall parts (1a), (1b) of the housing (1) is communicated with the upper subspace inside of the partition (2) through a communication passage (30) in a communication pipe (29) bridged between the upper end of the partition (2) and the inner wall part (1a) of the housing (1) so as to pass through them in gas-tight manner.

On the other hand, the lower end of the outer wall part (1b) of the housing (1) is connected in gas-tight manner and fluid communication to the inner ends of a plurality of (two in the illustrated example) communication pipes (31), (31), ... located at circumferentially equally spaced intervals. A communication passage (23) in each of the communication pipes (31) is communicated with the lower end of the space between both the inner and outer wall parts (1a), (1b) of the housing (1). Further, the communication passages (32) in the communication pipes (31), the space between both the wall parts (1a), (1b) of the housing (1), the communication passage (30) in the communication pipe (29) and the upper subspace inside of the partition (2) constitute a downstream half of the feed gas passage (3), and the space between both the bottom walls of the housing (1) and the partition (2) and the space between the outer periphery of the partition (2) and the inner periphery of the housing (1) constitute a reformed gas passage (11) communicating with the outlet (6b) of the reforming reaction section (6). The feed gas from the after-mentioned heat recovery section (34) is supplied to the space between both the wall parts (1a), (1b) of the housing (1) through each of the communication passages (32), introduced from the upper end of the space into the upper subspace inside of the partition (2) through the communication passage (30), and then supplied to the inlet (6a) at the upper end of the reforming reaction section (6) through the gas holes (28), (28), ... in the inlet side divider (27). Further, the reformed gas produced by reforming in the reforming reaction section (6) exits from the outlet (6b), flows through the space between both the bottom walls of the partition (2) and the housing (1) through the gas holes (28), (28), ... in the bottom wall of the housing (1) and is then supplied to the reformed gas outlet (12) at the upper end of the housing (1) through the space between the outer periphery of the partition (2) and the inner periphery of the housing (1).

Figure 9:
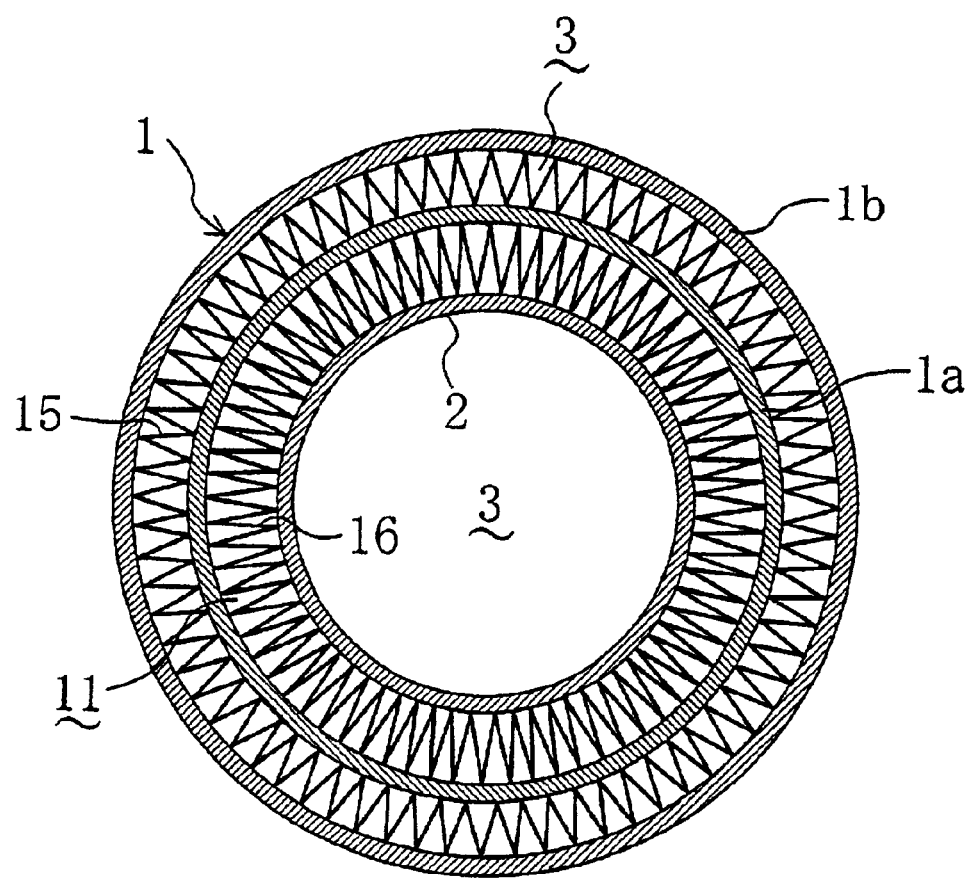
FIG. 9 is a cross-sectional view taken along the line IX—IX of FIG. 8.

Between the reformed gas passage (11) communicating with the outlet (6b) of the reforming reaction section (6) and the feed gas passage (3) communicating with the inlet (6a) of the reforming reaction section (6), a heat exchanger (14) is provided for heat-exchanging the reformed gas in the reformed gas passage (11) and the feed gas in the feed gas passage (3). This heat exchanger (14) consists of a finned heat exchanger with heat transfer fins (15), (16) which are presented to the feed gas passage (3) and the reformed gas passage (11), respectively, and extend along gas flows passing thereinside. Specifically, the feed gas side heat transfer fin (15) is fixedly connected between the outer periphery of the inner wall part (1a) and the inner periphery of the outer wall part (1b) of the housing (1) so as to be presented to the feed gas passage (3) at a position lower than the connecting position of the communication passage (30). Further, the reformed gas side heat transfer fin (16) is fixedly connected between the outer periphery of the partition (2) and the inner periphery of the inner wall part (1a) of the housing (1) so as to be presented to the reformed gas passage (11) at a position corresponding to the feed gas side heat transfer fin (15). As shown in enlarged manner in FIG. 9, each of the heat transfer fins (15), (16) is bent in a corrugated shape. Further, each bent portion of the feed gas side heat transfer fin (15) is fixed by brazing to the inner periphery of the outer wall part (1b) and the outer periphery of the inner wall part (1a) of the housing (1), while each bent portion of the reformed gas side heat transfer fin (16) is fixed by brazing to the outer periphery of the partition (2) and the inner periphery of the inner wall part (1a) of the housing (1).

According to the above arrangement, the heat exchanger (14) takes the form of a parallel flow type one in which the feed gas in the feed gas passage (3) and the reformed gas in the reformed gas passage (11) both flow in the same direction from the inlet side (lower side in FIG. 8) to the outlet side (upper side in the same figure) of the heat transfer fins (15), (16). Further, the portion of the feed gas passage (11) which communicates the heat exchanger (14) with the outlet (6b) of the reforming reaction section (6) is provided around the reforming reaction section (6).

Furthermore, the heat recovery section (34) formed of an annular space is disposed around the housing (1) and spaced predetermined distances away from the reforming reaction section (6) and the heat exchanger (14) so as to surround them. In other words, a cylinder (35) with a length substantially from the bottom end of the housing (1) to the top end of the partition (2) is disposed concentrically around the housing (1). The cylinder (35) consists of concentrically arranged cylindrical inner and outer sidewalls (35a), (35b) of different diameters and top and bottom walls (35c), (35d) in annular shape for closing upper and lower openings of an annular space between both the sidewalls (35a), (35b) in gas-tight manner. The space surrounded by the inner and outer sidewalls (35a), (35b) and top and bottom walls (35c), (35d) constitutes the heat recovery section (34). Further, the inner sidewall (35a) is fixedly connected at its substantially vertically midportion in fluid communication to the outer end of each of the communication pipes (31) which is fixedly connected at its inner end to the lower end of the outer wall part (1b) of the housing (1). On the other hand, the lower end of the outer sidewall (35b) is communicated with a feed gas inlet (4) inside of a fed gas entrance pipe (37). Portions from the feed gas inlet (4) to the heat recovery section (34) constitute an upstream half of the feed gas passage (3). Accordingly, the heat recovery section (34) is provided in a portion of the feed gas passage (3) upstream from the heat exchanger (14) so as to surround the reforming reaction section (6) and the heat exchanger (14) while being spaced away therefrom. Furthermore, the heat recovery section (34) and the heat exchanger (14) are communicated with each other through the plurality of communication passages (32), (32), . . . The distance between the reforming reaction section (6) and the heat recovery section (34) is set, for example, such that when the outer diameter d1 of the lower portion of the housing (1) is 60.5 mm, the inner diameter d2 of the inner sidewall (35a) of the cylinder (35) is 134.2 mm.

Further, the housing (1), the communication pipes (31), the cylinder (35) and the feed gas entrance pipe (37) are all embedded into a thermal insulator (22) as a heat transfer rate control member of ceramic wool or the like. Accordingly, the thermal insulator (22) functioning as a heat transfer rate control member is interposed between the heat recovery section (34) and both the reforming reaction section (6) and the heat exchanger (14), more specifically,-between the inner periphery of the inner sidewall (35a) of the cylinder (35) and the outer periphery of the housing (1).

According to this embodiment, the feed gas introduced into the feed gas inlet (4) is supplied to the heat recovery section (34) inside of the cylinder (35), and then introduced from the heat recovery section (34) through each of the communication passages (32) into the lower portion of the space between the inner and outer wall parts (1a), (1b) of the housing (1). The feed gas introduced into the space passes through the clearances of the feed gas side heat transfer fin (15) of the heat exchanger (14) toward the upper end of the space between the wall parts (1a), (1b) while being heated by heat exchange with the reformed gas, is supplied from the upper end of the space through the communication passage (30) to the upper subspace inside of the partition (2), passes through the gas holes (28), (28), of the inlet side divider (27) from the upper subspace, is introduced into the reforming reaction section (6) through the inlet (6a), and is reformed into hydrogen-rich reformed gas by reaction including partial oxidation with the catalyst therein. The reformed gas having exited from the outlet (6b) of the reforming reaction section (6) passes through the gas holes (28), (28), . . . in the bottom wall of the partition (2), moves to the space between both the bottom walls of the housing (1) and the partition (2), flows into the heat exchanger (14) through the space (reformed gas passage (11)) around the partition (2) which corresponds to the reforming reaction section (6), is supplied to the reformed gas outlet (12) past the clearances of the reformed gas side heat transfer fin (16), and releases heat in the heat exchanger (14) to provide for the heating of the feed gas flowing in the clearances of the feed gas side heat transfer fin (15).

In this case, like Embodiment 1, the feed gas in the feed gas passage (3) which is being supplied to the reforming reaction section (6) is heated in the heat exchanger (14) through the heat exchange with the reformed gas in the reformed gas passage (11) heated to a high temperature by heat of reaction in the reforming reaction section (6). Therefore, the heat of reaction in the reforming reaction section (6) can be recovered for the purpose of preheating the feed gas, and this self-recovery of heat can improve the thermal efficiency of the reformer (A).

In addition, since the heat of reaction in the reforming reaction section (6) heats the feed gas in the feed gas passage (3) in the above manner, a preheater for preheating the feed gas is formed integrally between the feed gas passage (3) and the reformed gas passage (11). This makes the construction of the reformer (A) simple and compact.

Further, in this embodiment, the heat recovery section (34) of annular space forming part of the feed gas passage (3) is provided in a portion of the feed gas passage (3) upstream from the heat exchanger (14) and the heat recovery section (34) is spaced away from the reforming reaction section (6) and the heat exchanger (14) so as to surround them. Therefore, heat dissipating from the reforming reaction section (6) and the heat exchanger (14) to the surroundings of the reformer (A) can be efficiently recovered by the heat recovery section (34) to heat the feed gas. As a result, the heat loss of the entire reformer (A) can be reduced so that the feed gas temperature at the inlet (6a) of the reforming reaction section (6) can be held at a temperature at which excellent catalytic reaction can be maintained in the reforming reaction section (6).

In addition, since the thermal insulator (22) functioning as a heat transfer rate control member is interposed between the heat recovery section (34) and both the reforming reaction section (6) and the heat exchanger (14), this enables heat recovery in the heat recovery section (34) with reduction in the distance between the heat recovery section (34) and both the reforming reaction section (6) and the heat exchanger (14). Accordingly, even in the construction including the heat recovery section (34), the partial oxidation reformer (A) can be compacted.

Further, since the heat recovery section (34) and the heat exchanger (14) are communicated with each other through the plurality of communication passages (32), (32), . . . , this simplifies the construction of the reformer (A) and facilitates insertion of the thermal insulator (22) to be interposed between the heat recovery section (34) and both the reforming reaction section (6) and the heat exchanger (14), i.e., between the housing (1) and the cylinder (35), thereby facilitating fabrication of the reformer (A).

Furthermore, since part of the reformed gas passage (11) leading from the outlet (6b) of the reforming reaction section (6) to the heat exchanger (14) is provided to surround the reforming reaction section (6), the periphery of the reforming reaction section (6) is covered with the reformed gas passage (11) so as to be thermally insulated. Accordingly, the temperature in the reforming reaction section (6) can be held at excellent catalytic reaction temperatures. In addition, since the reformed gas passage (11) leading from the outlet (6b) of the reforming reaction section (6) to the heat exchanger (14) is integrally formed around the reformed reaction section (6) in the above manner, this makes the construction of the reformer (A) simple and compact.

Further, since the heat exchanger (14) is a parallel flow heat exchanger in which the feed gas in the feed gas passage (3) and the reformed gas in the reformed gas passage (11) flow in the same direction from the inlet side to outlet side of each heat transfer fin (15), (16), even if the gas flow rate changes in the reforming reaction section (6) due to a load variation of the reformer (A), the gas temperatures at the inlet (6a) and outlet (6b) of the reforming reaction section (6) can be each held substantially at a constant value without being affected by the change in gas flow rate. That is to say, since the amount of heat exchange in the heat exchanger (14) is constant, for a heat exchanger of the type which causes the feed gas and the reformed gas to flow in opposite directions from inlet to outlet (see Embodiment 1), the heat exchange rate becomes excessive on reduction in gas flow rate so that the feed gas temperature at the inlet (6a) of the reforming reaction section (6) may rise excessively while the reformed gas temperature at the outlet (6b) may drop excessively. In this embodiment, however, since the heat exchanger (14) is a parallel flow heat exchanger, there never arise such a problem.

In addition, since the heat exchanger (14) is a finned heat exchanger including heat transfer fins (15), (16) which extend along respective gas flows of the feed gas in the feed gas passage (3) and the reformed gas in the reformed gas passage (11), gas pressure loss in the heat exchanger (14) can be reduced and the heat exchanger (14) can be compacted.

Further, since the heat transfer fins (15), (16) are bent in a corrugated shape, the heat transfer fins (15), (16) and by extension the heat exchanger (14) can be easily manufactured.

Furthermore, since the heat transfer fins (15), (16) are fixed at their bent portions to the wall parts (1a), (1b) of the housing (1) and the partition (2) by brazing, the contact thermal resistance of the heat transfer fins (15), (16) to the housing (1) and the partition (2) is reduced thereby ensuring stable heat exchange performance with volume production of the heat exchanger (14) (reformer (A)).

The communication of the heat recovery section (34) with the space between both the wall parts (1a), (1b) of the housing (1) may be made by not the plurality of communication passages (32) (communication pipes (31)) but a single communication passage (32).

Further, in the above embodiment, the heat recovery section (34) is disposed to surround both the reforming reaction section (6) and the heat exchanger (14). However, the heat recovery section (34) may also be disposed to surround either the reforming reaction section (6) or the heat exchanger (14).

Figure 10:
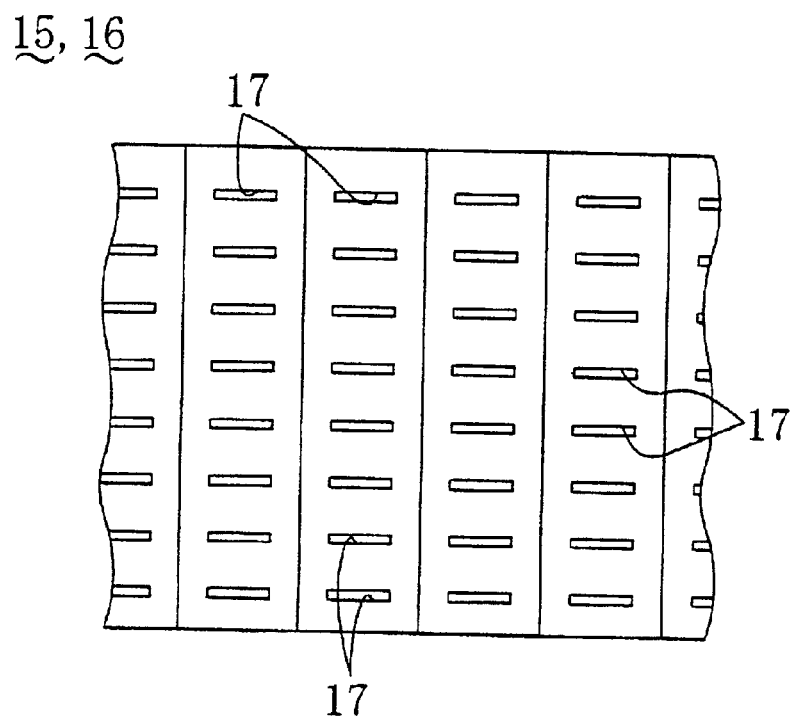
FIG. 10 is an enlarged front view showing in a developed manner a heat transfer fin with slits.
Figure 11:
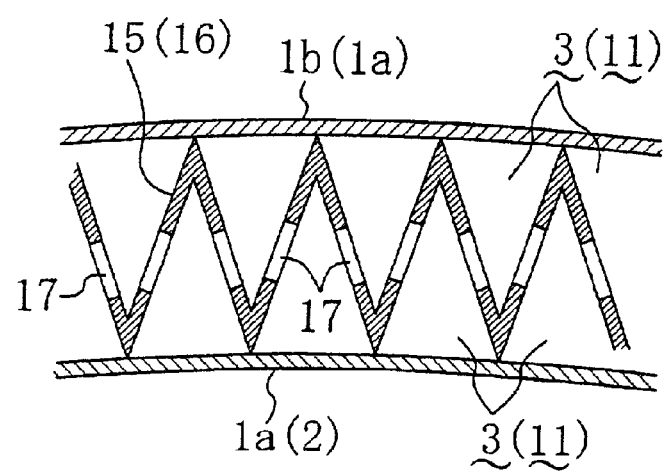
FIG. 11 is an enlarged cross-sectional view of the heat transfer fin with slits.

Furthermore, as shown in FIGS. 10 and 11 (FIG. 10 illustrates the heat transfer fin (15), (16) in its developed state), a large number of slits (17), (17), . . . (openings) may be formed in portions of the heat transfer fins (15), (16) other than their bent portions. In this case, even if the gas passages (3), (11) in the heat exchange (14) are each divided into two sub-passages located at a heat transfer surface side thereof and its opposite side by the heat transfer fins (15), (16), gases in both the sub-passages are mixed through the slits (17). This enables sufficient heat exchange of the gas in the opposite side sub-passage and provides high heat transfer performance at corners of the slit (17). Accordingly, there arises the advantage of improving heat exchange characteristics of the heat exchanger (14).

Embodiment 6

Figure 12:
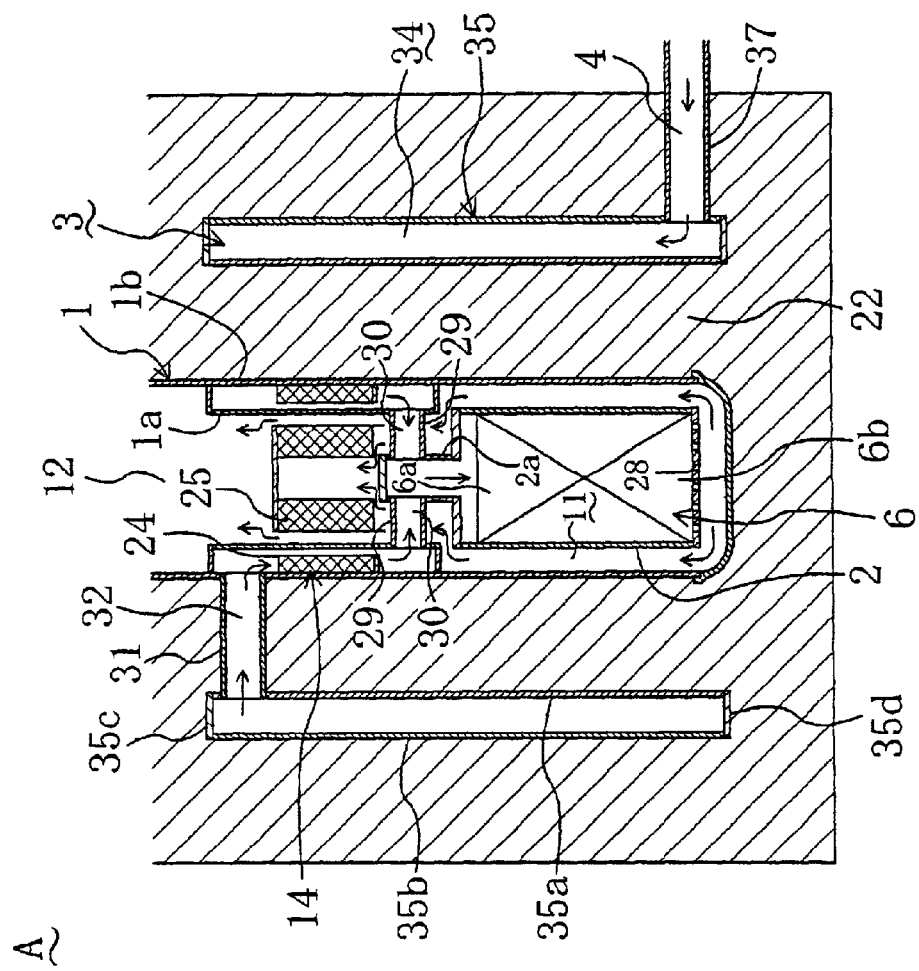
FIG. 12 is a corresponding view of FIG. 8 which shows Embodiment 6.

FIG. 12 shows Embodiment 6, wherein the type of a heat exchanger (14) is changed. Specifically, in this embodiment, the upper portion of a housing (1) has a double-wall structure consisting of an outer wall part (1b) located in the same level as the lower portion of the housing (1) and an inner wall part (1a) connected to the outer wall part (1b) in gas-tight manner so as to be spaced a distance away from the inner periphery of the outer wall part (1b). As a result, an annular space is created between both the wall parts (1a), (1b). This space is communicated at its upper end with a heat recovery section (34) in a cylinder (35) through a communication passage (32) in a communication pipe (31) passing through the outer wall part (1b). The upper portion of the partition (2) is formed into a reduced diameter portion (2a) smaller in diameter than the lower portion thereof. The upper end of the reduced diameter portion (2a) is located near to the lower end of the space between both the wall parts (1a), (1b) of the housing (1). The reduced diameter portion (2a) is communicated with the lower end of the space between both the wall parts (1a), (1b) through a plurality of communication passages (30), (30), . . . Thus, a feed gas passage (3) is formed for supplying the feed gas from the heat recovery section (34) to the inlet (6a) of the reforming reaction section (6) through the communication passage (32), the space between both the wall parts (1a), (1b) of the housing (1), the communication passages (30) and the reduced diameter portion (2a) of the partition (2).

Further, the heat exchanger (14) consists of: an annular reformed gas side porous material (25) of the same structure as that in Embodiment 4, which is disposed in a portion of a reformed gas passage (11) as a space in the inner wall part (1a) of the housing (1) so as to be located above the reduced diameter portion (2a) of the partition (2) and closed at the top end thereof; and an annular feed gas side porous material (24) disposed in the feed gas passage (3) as a space between both the wall parts (1a), (1b) of the housing (1) with its outer periphery fixed to the inner periphery of the outer wall part (1b). Heat exchange is made between the feed gas in the feed gas passage (3) and the reformed gas in the reformed gas passage (11) by heat radiation from both the porous materials (24), (25). In this embodiment, the heat exchanger (14) is, unlike Embodiment 5, a counterflow heat exchanger in which the feed gas in the feed gas passage (3) and the reformed gas in the reformed gas passage (11) flow in opposite directions from inlet to outlet. Other structures are the same as those in Embodiment 5. Accordingly, also in this embodiment, the same effects as those of Embodiment 5 can be obtained.

Embodiment 7

Figure 13:
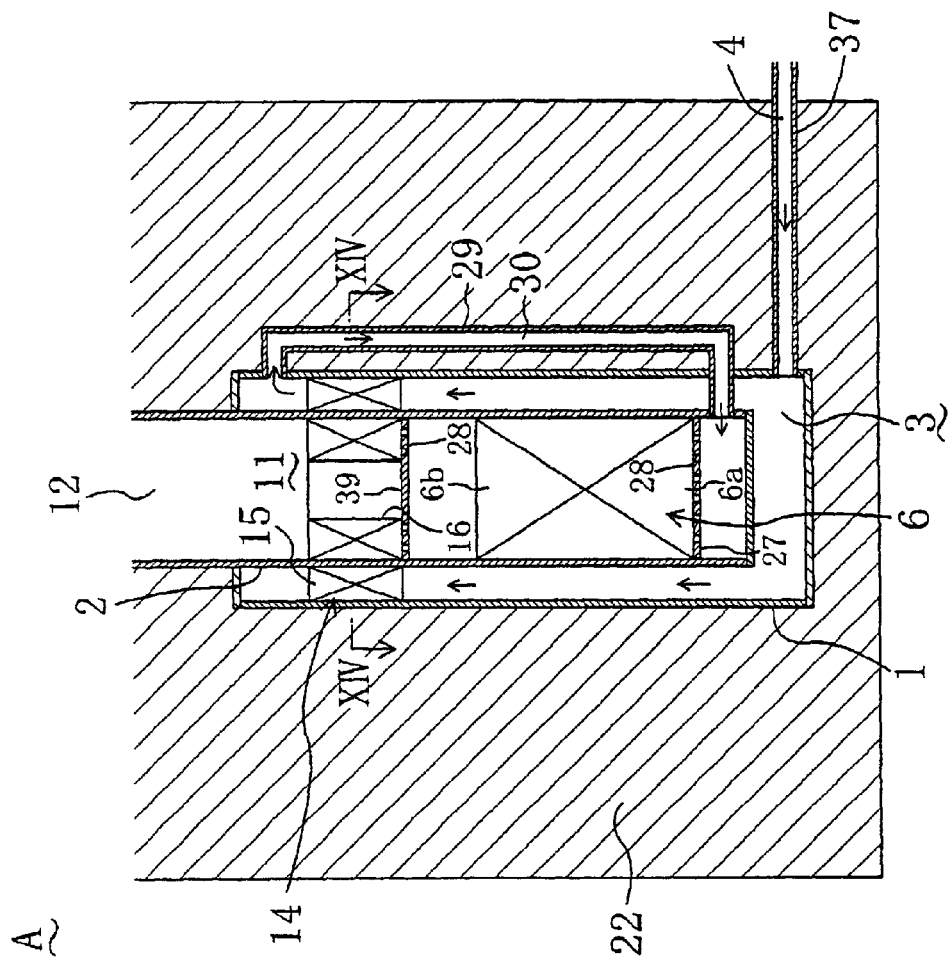
FIG. 13 is a corresponding view of FIG. 8 which shows Embodiment 7.

FIG. 13 shows Embodiment 7, wherein a reformed gas side heat transfer fin (16) of a heat exchanger (14) is disposed all around the inner periphery of a partition (2).

Specifically, in this embodiment, the partition (2) is disposed concentrically in a housing (1), an inlet side divider (27) having gas holes (28), (28), . . . is placed in the lower end portion of the inner space of the partition (2) so as to create a space with the bottom wall of the partition (2), a reforming reaction section (6) is contained in a portion of the inner space above the divider (27), and the upper end of the inner space of the partition (2) provides a reformed gas outlet (12).

The top end of the housing (1) is closed so as to be connected to the outer periphery of the partition (2). The lower end portion of a space between the housing (1) and the partition (2) is communicated with a feed gas inlet (4) in a feed gas entrance pipe (37), while the upper end portion thereof is communicated with a communication passage (30) in a communication pipe (29) passing through the upper end of the sidewall of the housing (1). The lower end of the communication pipe (29) passes through the housing (1) and the partition (2) in gas-tight manner to communicate with the space in the partition (2) located below the inlet side divider (27). Thus, a feed gas passage (3) is formed for supplying the gas at the feed gas inlet (4) from the lower end of the inner space of the housing (1) to the inlet (6a) of the reforming reaction section (6) through the space between the housing (1) and the partition (2) and the communication passage (30) in the communication pipe (29), and a reformed gas passage (11) is formed by a portion of the inner space of the partition (2) above the reforming reaction section (6).

Figure 14:
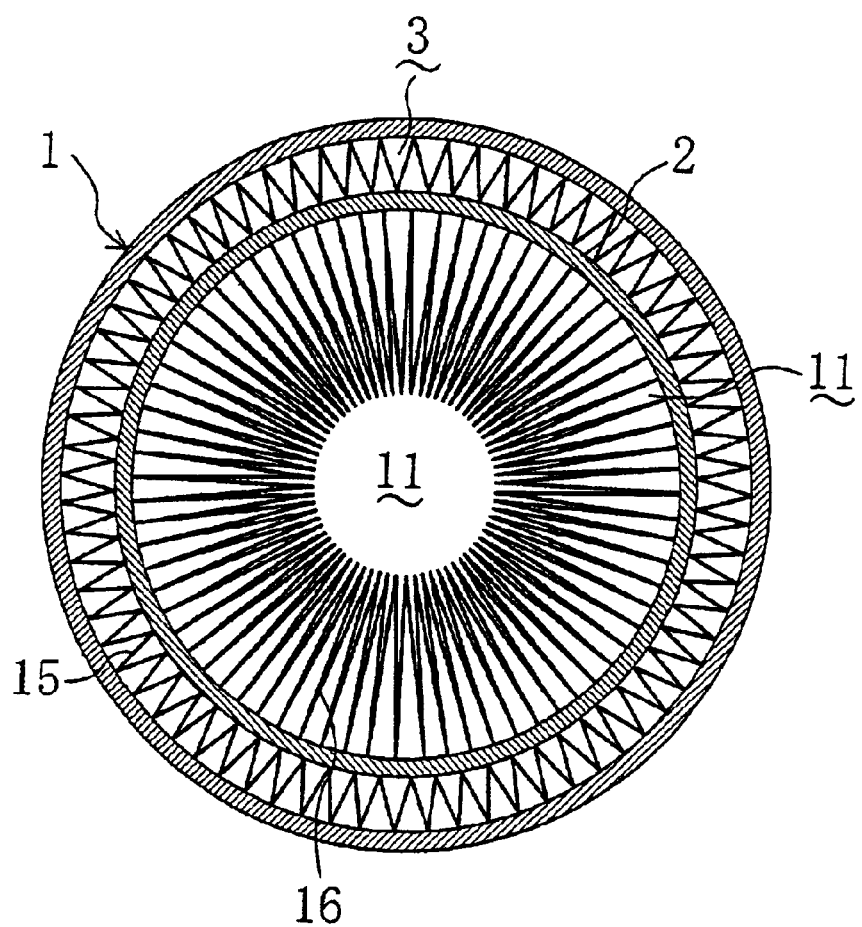
FIG. 14 is a cross-sectional view taken along the line XIV—XIV of FIG. 13.

Further, a parallel flow finned heat exchanger (14) as in Embodiment 5 is disposed over the reformed gas passage (11) as the space portion above the reforming reaction section (6) and the feed gas passage (3) as the space between the housing (1) and the partition (2). As shown in FIG. 14, like Embodiment 5, a feed gas side heat transfer fin (15) of the heat exchanger (14) is fixed at its inner peripheral and outer peripheral bent portions to the inner periphery of the housing (1) and the outer periphery of the partition (2) by brazing. On the other hand, although a reformed gas side heat transfer fin (16) also has an annular shape as a whole like the feed gas side heat transfer fin (15), only outer peripheral bent portions thereof are fixed to the inner periphery of the partition (2) by brazing but inner peripheral bent portions thereof are not fixed.

Furthermore, an outlet side divider (39) is placed below the reformed gas side heat transfer fin (16), and the peripheral edge of the divider (39) has a large number of gas holes (28), (28), . . . of through holes opened correspondingly to the position of the reformed gas side heat transfer fin (16). Thus, the reformed gas having exited from the outlet (6b) of the reforming reaction section (6) is allowed to pass through the gas holes (28), (28), . . . at the peripheral edge of he divider (39) so as to be forcibly guided to the reformed as side heat transfer fin (16).

In this embodiment, the heat recovery section (34) as disposed in Embodiment 5 is not provided.

According to this embodiment, there can be obtained the effects provided by using the parallel flow heat exchanger (14). Namely, even if the gas flow rate changes in the reforming reaction section (6) due to a load variation of the reformer (A), the gas temperatures at the inlet (6a) and outlet (6b) of the reforming reaction section (6) can be each held substantially at a constant value without being affected by the change in gas flow rate.

Further, since the heat exchanger (14) is a finned heat exchanger including heat transfer fins (15), (16) which are bent in a corrugated shape, gas pressure loss in the heat exchanger (14) can be reduced, the heat exchanger (14) can be compacted, and the heat transfer fins (15), (16) and the heat exchanger (14) can be easily manufactured. In addition, since the feed gas side heat transfer fin (15) of the heat exchanger (14) is fixed at its bent portions to the wall parts of the housing (1) and the partition (2) by brazing and the reformed gas side heat transfer fin (16) is fixed at its outer peripheral bent portions to the inner periphery of the partition (2) by brazing, the contact thermal resistance of the heat transfer fins (15), (16) to the housing (1) and the partition (2) is reduced thereby ensuring stable heat exchange performance of the heat exchanger (14).

Embodiment 8

Figure 15:
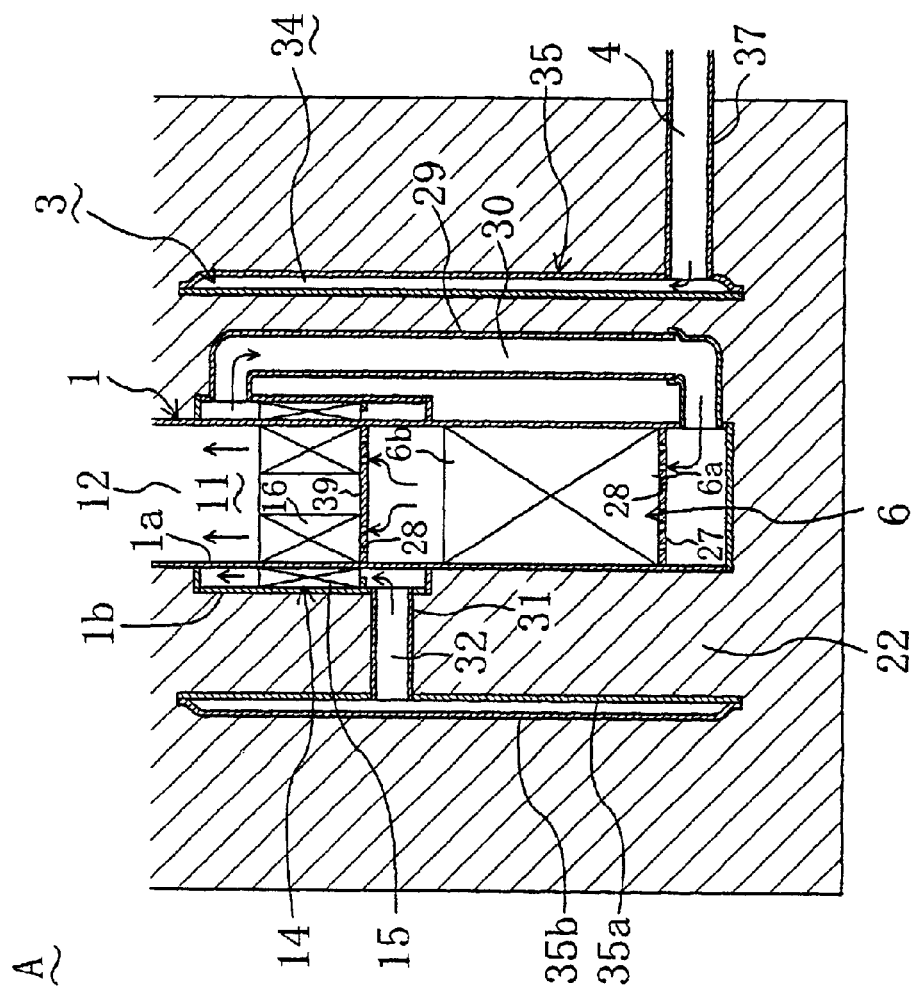
FIG. 15 is a corresponding view of FIG. 8 which shows Embodiment 8.

FIG. 15 shows Embodiment 8, wherein basically a heat recovery section (34) is added to the construction of Embodiment 7.

Specifically, in this embodiment, no partition (2) is provided inside of a housing (1), an inlet side divider (27) having gas holes (28), (28), . . . is disposed in the lower portion of the inner space of the housing (1) so as to create a space with the bottom wall of the housing (1), and a reforming reaction section (6) is disposed above the divider (27).

Further, like Embodiment 5 (see FIG. 8), the upper portion of the housing (1) has a double-wall structure consisting of an inner wall part (1a) located in the same level as the lower portion of the housing (1) and an outer wall part (1b) connected to the outer periphery of the inner wall part (1a). An annular space between both the wall parts (1a), (1b) is communicated at its upper end with the space at the lower end of the inner space of the housing (1) through a communication passage (30) in a communication pipe (29). The lower end of a space between both the wall parts (1a), (1b) is communicated with the heat recovery section (34) in a cylinder (35) through a communication passage (32) in a single (or plurality of) communication pipe (31).

Further, like Embodiment 7, a feed gas side heat transfer fin (15) of a parallel flow finned heat exchanger (14) is disposed in the space between both the wall parts (1a), (1b) of the housing (1), and a reformed gas side heat transfer fin (16) of the heat exchanger (14) as in Embodiment 7 (see FIG. 13) is disposed in an upper portion inside of the inner wall part (1a). The cylinder (35) forming the heat recovery section (34) is different in structure from that of Embodiment 5, that is, no top and bottom walls (35c), (35d) are provided and upper and lower ends of annular inner and outer sidewalls (35a), (35b) are directly connected together in gas-tight manner instead (in the illustrated example, the upper and lower ends of the outer sidewall (35b) are bent radially inward and then connected to the upper and lower ends of the inner sidewall (35a), respectively).

Accordingly, in this embodiment, the same effects as those of Embodiment 5 can be exhibited.

Embodiment 9

Figure 16:
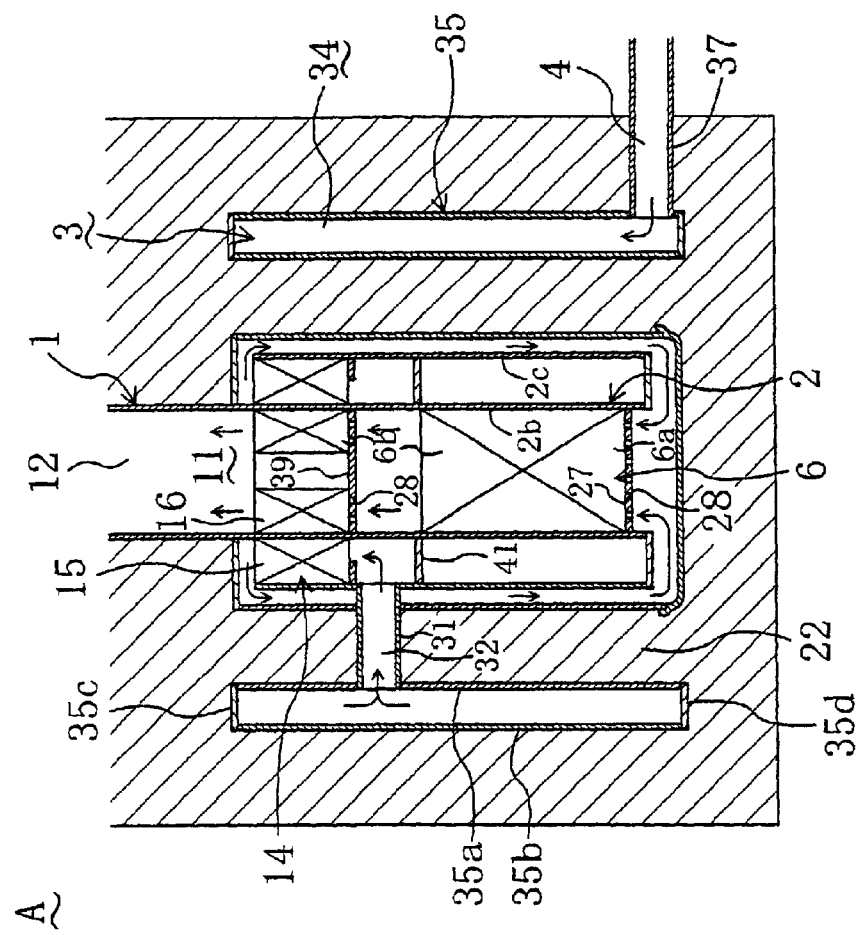
FIG. 16 is a corresponding view of FIG. 8 which shows Embodiment 9.

FIG. 16 shows Embodiment 9. In this embodiment, a partition (2) inside of a housing (1) is formed of a double-wall structure consisting of inner and outer sub-partitions (2b), (2c) concentrically spaced from each other. The lower end of a space between both the sub-partitions (2b), (2c) is closed in gas-tight manner by an annular bottom wall (2d), while the upper end of the space is open. Further, an inlet side divider (27) having gas holes (28), (28), . . . is placed in the lower end portion of the inner space of the inner sub-partition (2b), and a reforming reaction section (6) is contained in a portion of the inner space above the divider (27). On the other hand, a reformed gas side heat transfer fin (16) of a parallel flow finned heat exchanger (14) is disposed at the upper end of the inner space of the inner sub-partition (2b) like Embodiment 7. The annular space between both the sub-partitions (2b), (2c) is divided substantially at a vertically midportion thereof into subspaces by an annular divider (41). In the upper subspace thereof, a feed gas side heat transfer fin (15) of the heat exchanger (14) is contained and fixed by brazing. The inner end of a communication passage (32), which communicates at its outer end with a heat recovery section (34), is connected to the space between the inner and outer sub-partitions (2b), (2c) at a portion thereof located between the feed gas side heat transfer fin (15) and the divider (41). Thus, the feed gas, having been supplied from the heat recovery section (34) to the portion located above the divider (41) in the space between the inner and outer sub-partitions (2b), (2c) through the communication passage (32), passes through the feed gas side heat transfer fin (15), is introduced from the upper end of the space between the inner and outer sub-partitions (2b), (2c) into the space between the housing (1) and the outer sub-partition (2c), flows through the space around the outer sub-partition (2c), and is then supplied to the inlet (6a) of the reforming reaction section (6). A cylinder (35) forming the heat recovery section (34) is the same structure as that in Embodiment 5.

Other structures are the same as those in Embodiment 5. Accordingly, also in this embodiment, the same effects as those of Embodiment 6 can be exhibited.

Embodiment 10

Figure 17:
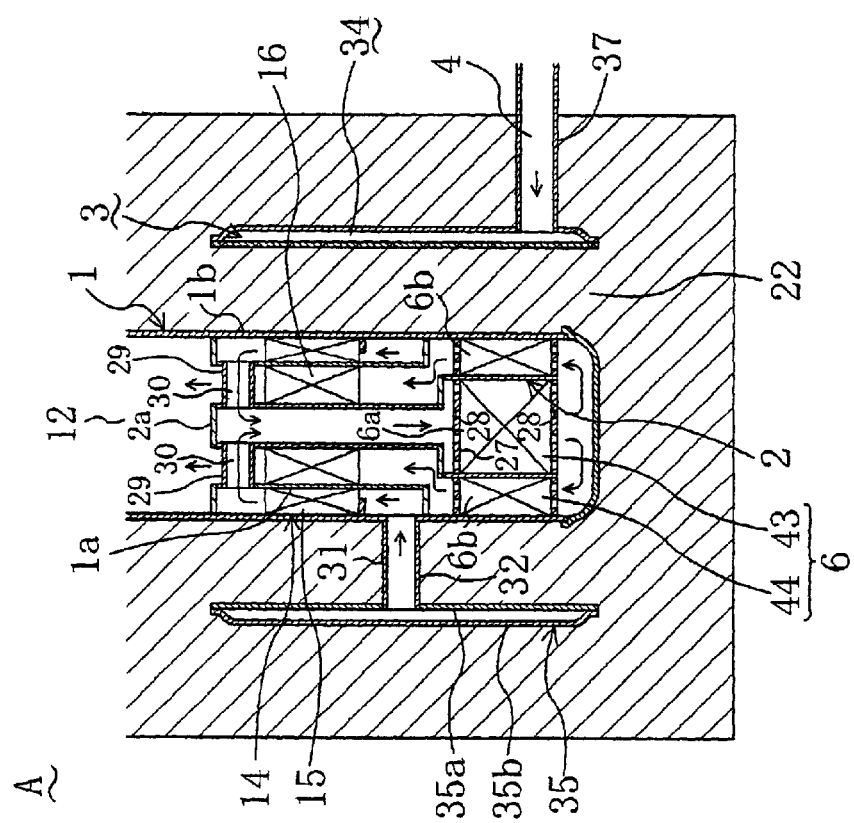
FIG. 17 is a corresponding view of FIG. 8 which shows Embodiment 10.

FIG. 17 shows Embodiment 10, wherein a reforming reaction section (6) is divided.

Specifically, in this embodiment, like Embodiment 6, the upper portion of a housing (1) is formed of a double-wall structure consisting of an outer wall part (1b) located in the same level as the lower portion of the housing (1) and an inner wall part (1a) connected to the inner periphery of the outer wall part (1b). An annular space is created between both the wall parts (1a), (1b), and this space is communicated at its lower end with a heat recovery section (34) in a cylinder (35) through a communication passage (32). The cylinder (35) is, like Embodiment 8 (see FIG. 15), formed by directly connecting the upper and lower ends of the inner and outer sidewalls (35a), (35b).

The upper end of a reduced diameter portion (2a) as the upper portion of a partition (2) is located near to the upper end of the space between both the wall parts (1a), (1b) of the housing (1). The reduced diameter portion (2a) is communicated with the upper end of the space between both the wall parts (1a), (1b) through a plurality of communication passages (30), (30), . . . Thus, a feed gas passage (3) is formed for supplying the feed gas from the heat recovery section (34) to an inlet (6a) of the reforming reaction section (6) through the communication passage (32), the space between both the wall parts (1a), (1b) of the housing (1), the communication passages (30), (30), . . . and the reduced diameter portion (2a) of the partition (2).

Further, in a portion of the feed gas passage (3) which is the space between both the wall parts (1a), (1b) of the housing (1), a feed gas side heat transfer fin (15) of a parallel flow finned heat exchanger (14) is fixed by brazing at its outer and inner peripheries to the inner periphery of the outer wall part (1b) and the outer periphery of the inner wall part (1a), respectively. In a reformed gas passage (11) which is a space between the inner wall part (1a) and the reduced diameter portion (2a) of the partition (2), a reformed gas side heat transfer fin (16) is fixed by brazing at its outer and inner peripheries to the inner periphery of the inner wall part (1a) and the outer periphery of the reduced diameter portion (2a), respectively.

The reforming reaction section (6) is divided into a columnar first reaction section (43) located in the lower portion of the partition (2) and an annular second reaction section (44) provided around the first reaction section (43), i.e., in a space between the lower portion of the inner space of the housing (1) and the lower portion of the partition (2). An inlet of the second reaction section (44) located at the lower end thereof communicates with an outlet of the first reaction section (43) located at the lower end thereof through a space between both the bottom walls of the housing (1) and the partition (2). A gas flow in the first reaction section (43) is directed downward, while a gas flow in the second reaction section (44) is directed upward. The both the reaction sections thereby have gas flows in opposite directions.

Accordingly, in this embodiment, the feed gas from the heat recovery section (34) is supplied to the space between the inner and outer wall parts (1a), (1b) of the housing (1) past the communication passage (32), heated in the feed gas side heat transfer fin (15) of the heat exchanger (14) and then introduced into the inlet (6a) of the reforming reaction section (6) through the communication passages (30), (30), . . . and the reduced diameter portion (2a) of the partition (2). On the other hand, the reformed gas produced in the reforming reaction section (6) passes through the space (reformed gas passage (11)) between the inner wall part (1a) of the housing (1) and the reduced diameter portion (2a) of the partition (2), undergoes heat absorption in the reformed gas side heat transfer fin (16) of the heat exchanger (14) and then reaches a reformed gas outlet (12).

During the time, the first reaction section (43) of the reforming reaction section (6) is thermally insulated by the second reaction section (44) which surrounds the first reaction section (43), because the reformed reaction section (6) is divided in series into the first reaction section (43) in the partition (2) and the second reaction section (44) provided around the first reaction section (43) and gas flows in the first and second reaction sections (43), (44) are directed oppositely. Accordingly, the inner temperature of the reforming reaction section (6) can be held at high temperatures. In addition, by forming the reforming reaction section (6) itself in a double-wall structure, the construction of the reformer (A) can be simplified and compacted.

Embodiment 11

Figure 18:
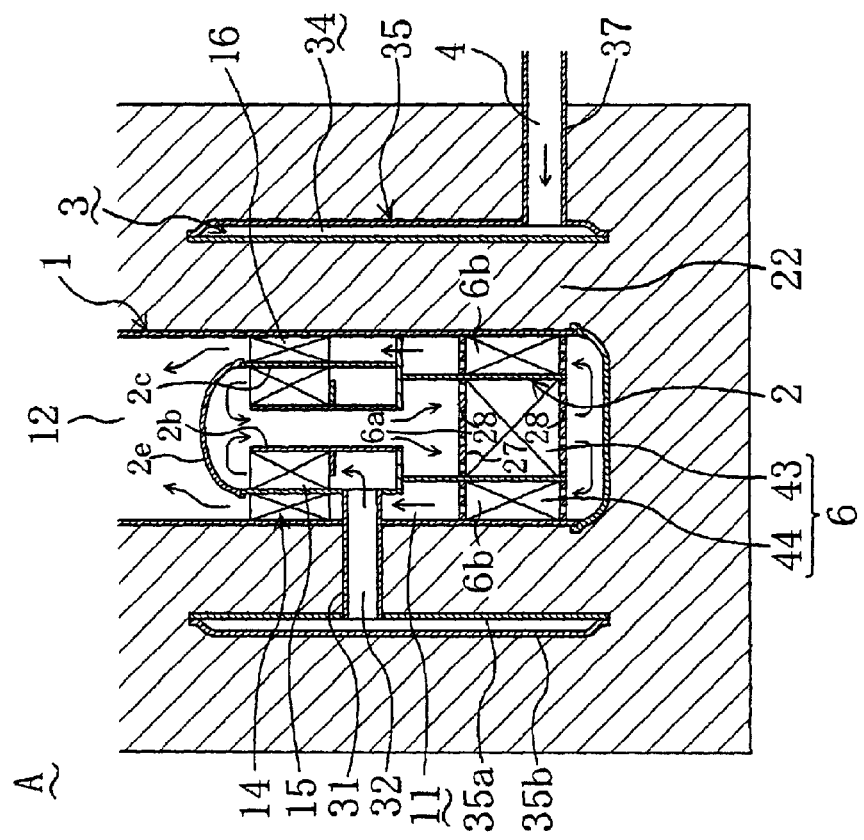
FIG. 18 is a corresponding view of FIG. 8 which shows Embodiment 11.

FIG. 18 shows Embodiment 11, wherein the positions of the feed gas side heat transfer fin (15) and the reformed gas side heat transfer fin (16) of the heat exchanger (14) in the construction of Embodiment 10 (see FIG. 17) are changed to each other.

Specifically, in this embodiment, the upper portion of a partition (2) is partially formed in a double-wall structure consisting of concentrically disposed inner and outer sub-partitions (2b), (2c), and an upwardly opening, bottomed annular space is formed between both the sub-partitions (2b), (2c). Further, one end of the outer wall of the outer sub-partition (2c) is closed in gas-tight manner by a domed top wall (2e) such that a clearance is left above the upper end of the inner sub-partition (2b). Furthermore, a feed gas side heat transfer fin (15) and a reformed gas side heat transfer fin (16) of a parallel flow finned heat exchanger (14) are disposed in the upper portion of the space between both the sub-partitions (2b), (2c) of the partition (2) and in the space between the outer sub-partition (2c) and the housing (1), respectively. Further, a communication passage (32) extending from a heat recovery section (34) is communicated with the lower end of the space between both the sub-partitions (2b), (2c) of the partition (2). Thus, the feed gas, having been supplied from the heat recovery section (34) to the lower end of the space between both the sub-partitions (2b), (2c) of the partition (2) past the communication passage (32), is heated in the feed gas side heat transfer fin (15) of the heat exchanger (14), introduced into the inner sub-partition (2b) through its upper end, and then supplied to a first reaction section (43) of a reforming reaction section (6).

Accordingly, also in this embodiment, the same effects as those of Embodiment 10 can be obtained.

In each of the above embodiments, the reforming reaction section (7) is formed of a monolith. In this invention, however, a reforming reaction section loaded with particulate catalysts can be used. Further, it goes without saying that the present invention is applicable for reformers to be used for systems other than the fuel cell system as shown in the above embodiments.

Industrial Applicability

According to the present invention, in producing hydrogen used for fuel cells and hydrogen engines by reforming feed gas containing hydrocarbon or methanol by partial oxidation reaction in a reforming reaction section, temperature variations in the reforming reaction section can be reduced, the feed gas can be preheated by heat of reaction in the reforming reaction section to improve the thermal efficiency by self-recovery of heat, and the preheater for preheating the feed gas can be integrally formed to compact the construction of the reformer. Accordingly, the present invention has a high industrial applicability in that fuel cells and hydrogen engines can be improved in practicability.

What is claimed is:

1. A partial oxidation reformer having a reforming reaction section (6) for producing hydrogen-rich reformed gas from feed gas by reaction including partial oxidation, characterized in that:

said reformer includes a cylindrical housing (1) and a cylindrical partition (2) that is disposed in and spaced away from the housing (1) and internally provided with the reforming reaction section (6);

a reformed gas passage (11) that communicates with an outlet (6b) of the reforming reaction section (6) is provided in the partition (2) and a feed gas passage (3) that communicates with an inlet (6a) of the reforming reaction section (6) is provided between the housing (1) and the partition (2); and a heat exchanger (14) is provided for exchanging heat between the reformed gas in the reformed gas passage (11) and the feed gas in the feed gas passage (3).

2. The partial oxidation reformer of claim 1, characterized in that a heat transfer rate control member (10) is provided for controlling the rate of heat transfer between the reforming reaction section (6) and the feed gas passage (3).

3. The partial oxidation reformer of claim 2, characterized in that the heat transfer rate control member (10) is of fire-resistant thermal insulant.

4. The partial oxidation reformer of claim 1, characterized in that the reforming reaction section (6), the feed gas passage (3), the reformed gas passage (11) and the heat transfer rate control member (10) are provided integrally in the housing (1).

5. The partial oxidation reformer of claim 1, characterized in that the reforming reaction section (6) is formed of a monolith (7) with a honeycomb structure.

6. The partial oxidation reformer of claim 1, characterized in that the heat exchanger (14) includes heat transfer fins (15), (16) that are presented to the feed gas passage (3) and the reformed gas passage (11), respectively, and run along respective gas flows in the feed and reformed gas passages, and the heat transfer fins (15), (16) are bent in a corrugated shape.

7. The partial oxidation reformer of claim 6, characterized in that the heat transfer fins (15), (16) are fixed to surrounding walls by brazing.

8. The partial oxidation reformer of claim 6 or 7, characterized in that the heat transfer fins (15), (16) are each formed with slits (17).

9. The partial oxidation reformer of claim 1, caracterized in that the feed gas passage (3) is provided at a portion thereof upstream from the heat exchanger (14) with a heat recovery section (34) formed of a substantially annular space which is located away from the reforming reaction section (6) or the heat exchanger (14) to surround at least one of the reforming reaction section (6) and the eat exchanger (14).

10. The partial oxidation reformer of claim 9, characterized in that a heat transfer rate control member (22) is interposed between the heat recovery section (34) and the reforming reaction section (6) or the heat exchanger (14).

11. The partial oxidation reformer of claim 1, characterized in that the reformed gas passage (11) may be provided in the vicinity of the reforming reaction section (6) to communicate the outlet (6b) of the reforming reaction section (6) with the heat exchanger (14) therethrough.

12. The partial oxidation reformer of claim 1, characterized in that the reforming reaction section (6) is divided into a first reaction section (43) and a second reaction section (44), the second reaction section (44) being provided in the vicinity of the first reaction section (43) to communicate at an inlet thereof with an outlet of the first reaction section (43), and the first and second reaction sections (43), (44) have gas flows in opposite directions.

* * * * *

UNITED STATES PATENT AND TRADEMARK OFFICE
CERTIFICATE OF CORRECTION

PATENT NO. : 6,770,106 B1 Page 1 of 1
DATED : August 3, 2004
INVENTOR(S) : Yasunori Okamoto et al.

It is certified that error appears in the above-identified patent and that said Letters Patent is hereby corrected as shown below:

Column 20,
Line 57, delete the word "eat" and insert the word -- heat --

Signed and Sealed this

Twenty-eighth Day of December, 2004

JON W. DUDAS
*Director of the United States Patent and Trademark Office*